United States Patent
Mukherjee et al.

(10) Patent No.: US 6,854,075 B2
(45) Date of Patent: *Feb. 8, 2005

(54) SIMULTANEOUS AND REDUNDANTLY THREADED PROCESSOR STORE INSTRUCTION COMPARATOR

(75) Inventors: Shubhendu S. Mukherjee, Framingham, MA (US); Steven K. Reinhardt, Ann Arbor, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 528 days.

This patent is subject to a terminal disclaimer.

(21) Appl. No.: 09/837,995

(22) Filed: Apr. 19, 2001

(65) Prior Publication Data

US 2001/0034824 A1 Oct. 25, 2001

Related U.S. Application Data

(60) Provisional application No. 60/198,530, filed on Apr. 19, 2000.

(51) Int. Cl.$^7$ ................................................. G06F 11/07
(52) U.S. Cl. ........................ 714/51; 714/53; 714/2; 714/10; 714/47; 712/227
(58) Field of Search .......................... 714/2, 5, 10, 47, 714/51, 53, 227, 235, 228; 712/227, 235, 228

(56) References Cited

U.S. PATENT DOCUMENTS

| | | | |
|---|---|---|---|
| 5,758,142 A | 5/1998 | McFarling et al. | 395/586 |
| 5,933,860 A | 8/1999 | Emer et al. | 711/213 |
| 6,334,184 B1 * | 12/2001 | Dhong et al. | 712/235 |
| 6,523,139 B1 * | 2/2003 | Banning et al. | 714/43 |
| 6,668,317 B1 * | 12/2003 | Bernstein et al. | 712/245 |
| 2001/0034854 A1 * | 10/2001 | Mukherjee | 714/5 |
| 2002/0133745 A1 * | 9/2002 | Okin | 714/11 |

OTHER PUBLICATIONS

*AR–SMT: Microarchitectural Approach To Fault Tolerance In Microprocessors*, Eric Rotenberg, (8 p.).

*DIVA: A Dynamic Approach To Microprocessor Verification*, Todd M. Austin, Journal of Instruction–Level Parallelism 2 (2000) 1–6, Sumitted Feb. 2000; published May 2000 (26 p.).

(List continued on next page.)

*Primary Examiner*—Robert Beausoliel
*Assistant Examiner*—Anne L. Damiano

(57) ABSTRACT

A simultaneous and redundantly threaded, pipelined processor executes the same set of instructions simultaneously as two separate threads to provide fault tolerance. One thread is processed ahead of the other thread so that the instructions in one thread are processed through the processor's pipeline ahead of the corresponding instructions from the other thread. The thread, whose instructions are processed earlier, places its committed stores in a store queue. Subsequently, the second thread places its committed stores in the store queue. A compare circuit periodically scans the store queue for matching store instructions. If otherwise matching store instructions differ in any way (address or data), then a fault has occurred in the processing and the compare circuits initiates fault recovery. If comparison of the two instructions reveals they are identical, the compare circuit allows only a single store instruction to pass to the data cache or the system main memory. In this way, transient faults are detected with a minimum amount of hardware overhead and independent of differences in the actual order of program execution or differences in branch speculation.

18 Claims, 2 Drawing Sheets

OTHER PUBLICATIONS

*DIVA: A Reliable Substrate For Deep Submicron Microarchitecture Design*, Todd M. Austin, May/Jun. 1999 (12 p.).

M. Franklin, "Incorporating Fault Tolerance in Superscalar Processors," Proceedings of High Performance Computing, Dec., 1996.

A. Mahmood et al., "Concurrent Error Detection Using Watchdog Processors—A Survey," IEEE Trans. on Computers, 37(2):160–174, Feb. 1988.

J. H. Patel et al., "Concurrent Error Detection In ALU's by Recomputing With Shifted Operands," IEEE Trans. on Computers, 31(7):589–595, Jul. 1982.

D. A. Reynolds et al., "Fault Detection Capabilities Of Alternating Logic," IEEE Trans. on Computers, 27(12):1093–1098, Dec. 1978.

E. Rotenberg et al., "Trace Cache: A Low Latency Approach To High Bandwidth Instruction Fetching," Proceedings of the 29th Annual International Symposium on Microarchitecture, pp. 24–34, Dec. 1996.

E. Rotenberg et al., "Trace Processors," 30th Annual International Symposium on Microarchitecture (MICRO–30), Dec. 1997.

T. J. Slegel et al., "IBM's S/390 G5 Microprocessor Design," IEEE Micro, pp. 12–23, Mar./Apr. 1999.

J. E. Smith et al., "Implementing Precise Interrupts In Pipelined Processors," IEEE Trans. on Computers, 37(5):562–573, May 1988.

G. S. Sohi et al., "A Study Of Time–Redundant Fault Tolerance Techniques For High–Performance Pipelined Computers," Digest of Papers, 19th International Symposium on Fault–Tolerant Computing, pp. 436–443, 1989.

G. S. Sohi et al., "Instruction Issue Logic For High–Performance, Interruptible, Multiple Functional Unit, Pipelined Computers," IEEE Transactions on Computers, 39(3):349–359, Mar. 1990.

D. M. Tullsen, et al., "Simultaneous Multithreading: Maximizing On–Chip Parallelism," Proceedings of the 22nd Annual International Symposium on Computer Architecture, Italy, Jun. 1995.

D. Tullsen et al., "Exploiting Choice: Instruction Fetch And Issue On An Implementable Simultaneous Multithreading Processor," Proceedings of the 23rd Annual International Symposium on Computer Architecture (ISCA), May, 1996.

S. K. Reinhardt et al., "Transient Fault Detection Via Simultaneous Multithreading" (12 p.).

L. Spainhower et al., "IBM S/390 Parallel Enterprise Server G5 Fault Tolerance: A Historical Perspective," IBM J. Res. Develop. vol. 43, No. 5/6, Sep./Nov. 1999, pp. 863–873.

M. Franklin, "A Study Of Time Redundant Fault Tolerance Techniques For Superscalar Processors" (5 p.).

K. Sundaramoorthy et al., "Slipstream Processors: Improving Both Performance And Fault Tolerance" (6 p.).

* cited by examiner

SIMULTANEOUS AND REDUNDANTLY THREADED PROCESSOR STORE INSTRUCTION COMPARATOR

CROSS-REFERENCE TO RELATED APPLICATIONS

This application is a non-provisional application claiming priority to provisional application Ser. No. 60/198,530, filed on Apr. 19, 2000, entitled "Transient Fault Detection Via Simultaneous Multithreading," the teachings of which are incorporated by reference herein as if reproduced in full below.

This application also relates to application Ser. No. 09/584,034, filed May 30, 2000, entitled "Slack Fetch to Improve Performance in a Simultaneous and Redundantly Threaded Processor," the teachings of which are incorporated by reference herein as if reproduced in full below.

This application also relates to application Ser. No. 09/839,626, entitled "Simultaneous and Redundantly Threaded Processor Uncache Load Address Comparator and Data Value Replication Circuit," filed concurrently herewith, the teachings of which are incorporated by reference herein as if reproduced in full below.

This application also relates to application Ser. No. 09/839,459, entitled "Cycle Count Replication in a Simultaneous and Redundantly Threaded Processor," filed concurrently herewith, the teachings of which are incorporated by reference herein as if reproduced in full below.

This application also relates to application Ser. No. 09/839,621, now U.S. Pat. No. 8,598,122, entitled "Active Load Address Buffer," filed Apr. 19, 2001, the teachings of which are incorporated by reference herein as if reproduced in full below.

This application also relates to application Ser. No. 09/838,078, entitled "Simultaneous and Redundantly Threaded Processor Branch Outcome Queue," filed concurrently herewith, the teachings of which are incorporated by reference herein as if reproduced in full below.

This application also relates to application Ser. No. 09/838,069, entitled "Input Replicator for Interrupts in a Simultaneous and Redundantly Threaded Processor," filed concurrently herewith, the teachings of which are incorporated by reference herein as if reproduced in full below.

This application also relates to application Ser. No. 09/839,624, entitled "Load Value Queue Input Replication in a Simultaneous and Redundantly Threaded Processor," filed concurrently herewith, the teachings of which are incorporated by reference herein as if reproduced in full below.

STATEMENT REGARDING FEDERALLY SPONSORED RESEARCH OR DEVELOPMENT

Not applicable.

BACKGROUND OF THE INVENTION

1. Field of the Invention

The present invention relates generally to microprocessors. More particularly, the present invention relates to a pipelined, simultaneous and redundantly threaded processor adapted to execute the same instruction set in at least two separate threads, and to verify for fault detection purposes only memory requests that affect data values in system memory. More particularly still, the invention relates to detecting transient faults between multiple processor threads by comparison of their store instructions.

2. Background of the Invention

Solid state electronics, such as microprocessors, are susceptible to transient hardware faults. For example, cosmic radiation can alter the voltage levels that represent data values in microprocessors, which typically include tens or hundreds of thousands of transistors. The changed voltage levels change the state of individual transistors, causing faulty operation. Faults caused by cosmic radiation typically are temporary and the transistors eventually operate normally again. The frequency of such transient faults is relatively low—typically less than one fault per year per thousand computers. Because of this relatively low failure rate, making computers fault tolerant currently is attractive more for mission-critical applications, such as online transaction processing and the space program, than computers used by average consumers. However, future microprocessors will be more prone to transient fault due to their smaller anticipated size, reduced voltage levels, higher transistor count, and reduced noise margins. Accordingly, even low-end personal computers benefit from being able to protect against such faults.

One way to protect solid state electronics from faults resulting from cosmic radiation is to surround the potentially effect electronics by a sufficient amount of concrete. It has been calculated that the energy flux of the cosmic radiation can be reduced to acceptable levels with at least six feet of concrete surrounding the chips to be protected. For obvious reasons, protecting electronics from faults caused by cosmic radiation with six feet of concrete usually is not feasible as computers are usually placed in buildings that have already been constructed without this amount of concrete. Because of the relatively low occurrence rate, other techniques for protecting microprocessors from faults created by cosmic radiation have been suggested or implemented that merely check for and correct the transient failures when they occur.

Rather than attempting to create an impenetrable barrier through which cosmic rays cannot pierce, it is generally more economically feasible and otherwise more desirable to provide the effected electronics with a way to detect and recover from faults caused by cosmic radiation. In this manner, a cosmic ray may still impact the device and cause a fault, but the device or system in which the device resides can detect and recover from the fault. This disclosure focuses on enabling microprocessors (referred to throughout this disclosure simply as "processors") to recover from a fault condition.

One technique for detecting transient faults is implemented in the Compaq Himalaya system. This technique includes two identical "lockstepped" microprocessors that have their clock cycles synchronized, and both processors are provided with identical inputs (i.e., the same instructions to execute, the same data, etc.). In the Compaq Himalaya system, each input to the processors, and each output from the processors, is verified and checked for any indication of a transient fault. That is, the hardware of the Himalaya system verifies all signals going to and leaving the Himalaya processors at the hardware signal level—the voltage levels on each conductor of each bus are compared. The hardware performing these checks and verifications is not concerned with the particular type of instruction it is comparing; rather, it is only concerned that two digital signals match. Thus, there is significant hardware and spatial overhead associated with performing transient fault detection by lockstepping duplicate processors in this manner.

The latest generation of high-speed processors achieve some of their processing speed advantage through the use of a "pipeline." A "pipelined" processor includes a series of units (e.g., fetch unit, decode unit, execution units, etc.), arranged so that several units can simultaneously process an appropriate part of several instructions. Thus, while one instruction is decoded, an earlier fetched instruction is executed. These instructions may come from one or more threads. Thus, a "simultaneous multithreaded" ("SMT") processor permits instructions from two or more different program threads (e.g., applications) to be processed simultaneously. However, it is possible to cycle lockstep the threads of an SMT processor to achieve fault tolerance.

An SMT processor can be modified so that the same program is simultaneously executed in two separate threads to provide fault tolerance within a single processor. Such a processor is called a simultaneous and redundantly threaded ("SRT") processor. Some of the modifications to turn a lockstep SMT processor into an SRT processor are described in Provisional Application Ser. No. 60/198,530. However, to utilize known transient fault detection requires that each thread of the SRT processor be lockstepped (as opposed to having two SRT processors lockstepped to each other). Hardware within the processor itself (in the Himalaya, the hardware is external to each processor) verifies the digital signal on each conductor of each bus. While increasing processor performance and yet still doing transient fault protection in this manner may have advantages over previous fault detecting systems, SRT processor performance can be enhanced.

One such performance enhancing technique is to allow each to processor to run independently. More particularly, one thread is allowed to execute program instructions ahead of the second thread. In this way, memory fetches and branch speculations are resolved ahead of time for the trailing thread. However, verifying, at the signal level, each input and output of each thread becomes complicated when the threads are not lockstepped (executing the same instruction at the same time).

A second performance enhancing technique for pipelined computers is an "out-of-order" processor. In an out-of-order processor each thread need not execute the program in the order it is presented; but rather, each thread may execute program steps out of sequence. The technique of fault tolerance by verifying bus voltage patterns between the two threads becomes increasingly difficult when each thread is capable of out-of-order processing. The problem is further exacerbated if the one processor thread leads in overall processing location within the executed program. In this situation not only would the leading thread be ahead, but this thread may also execute the instructions encountered in a different sequence than the trailing thread.

The final performance enhancing technique of SRT processor is speculative branch execution. In speculative branch execution a processor effectively guesses the outcome of a branch in the program thread and executes subsequent steps based on that speculation. If the speculation was correct, the processor saves significant time (over stalling for example) until the branch decision is resolved. In the case of an SRT processor it is possible that each thread makes speculative branch execution different than the other. Thus, it is impossible to do transient fault protection using known techniques—verifying digital signals on each bus—because it is possible there may be no corresponding signal between two threads.

What is needed is an SRT processor that can achieve performance gains over an SRT processor in which each thread is lockstepped by using the performance enhancing techniques noted above, and that can also do transient fault detection.

BRIEF SUMMARY OF THE INVENTION

The problems noted above are solved in large part by a simultaneous and redundantly threaded processor that has performance gains over an SRT processor with lockstepped threads and provides transient fault tolerance. The processor checks for transient faults by checking only memory requests (input/output ("I/O") commands, I/O requests) that directly or indirectly affect data values in system memory. More particularly, the preferred embodiments verify only writes (stores) that change data outside the bounds of the processor and uncached reads, e.g., a read from a virtual address space mapped to the hardware of an I/O device. Because this transient fault detection does not need to verify every input and output at the signal level, the transient fault protection extends to the threaded "out-of-order" processors, processors whose threads perform independent speculative branch execution, and processors with leading and lagging thread execution.

A preferred embodiment of the invention comprises a store queue and a compare circuit. The processor thread executing the program ahead, the leading thread, writes its committed stores to the store queue. Subsequently, the processor thread lagging or trailing, the trailing thread, writes its committed stores to the queue. Because the processors are preferably removed from each other in program execution stage and also may be executing the programs in different orders in each thread, there may be many committed stores written to the queue between when the leading queue writes and when the trailing queue writes the corresponding store. A compare circuit periodically scans the store queue looking for the corresponding stores. If the address and data information of the corresponding stores matches exactly, then each of the processors have operated without fault, and the data is written to the data cache or main memory. However, if any differences exist in the address or the data (actual data or differences in size of the store) to be written, the compare circuit initiates a fault recovery sequence.

Alternatively, a second embodiment of the invention comprises the store queue into which the leading thread places its committed stores. As the trailing thread reaches this point in the program execution, hardware and firmware associated with that thread compares the committed store, without the need of placing that store in the same queue as the previous committed store, and finds the corresponding committed store from the leading thread. If these two committed stores match exactly, the committed store placed in the queue is marked as verified and the trailing thread store is effectively discarded. The verified committed store is then sent to its appropriate location in the cache or main memory areas.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, microprocessor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
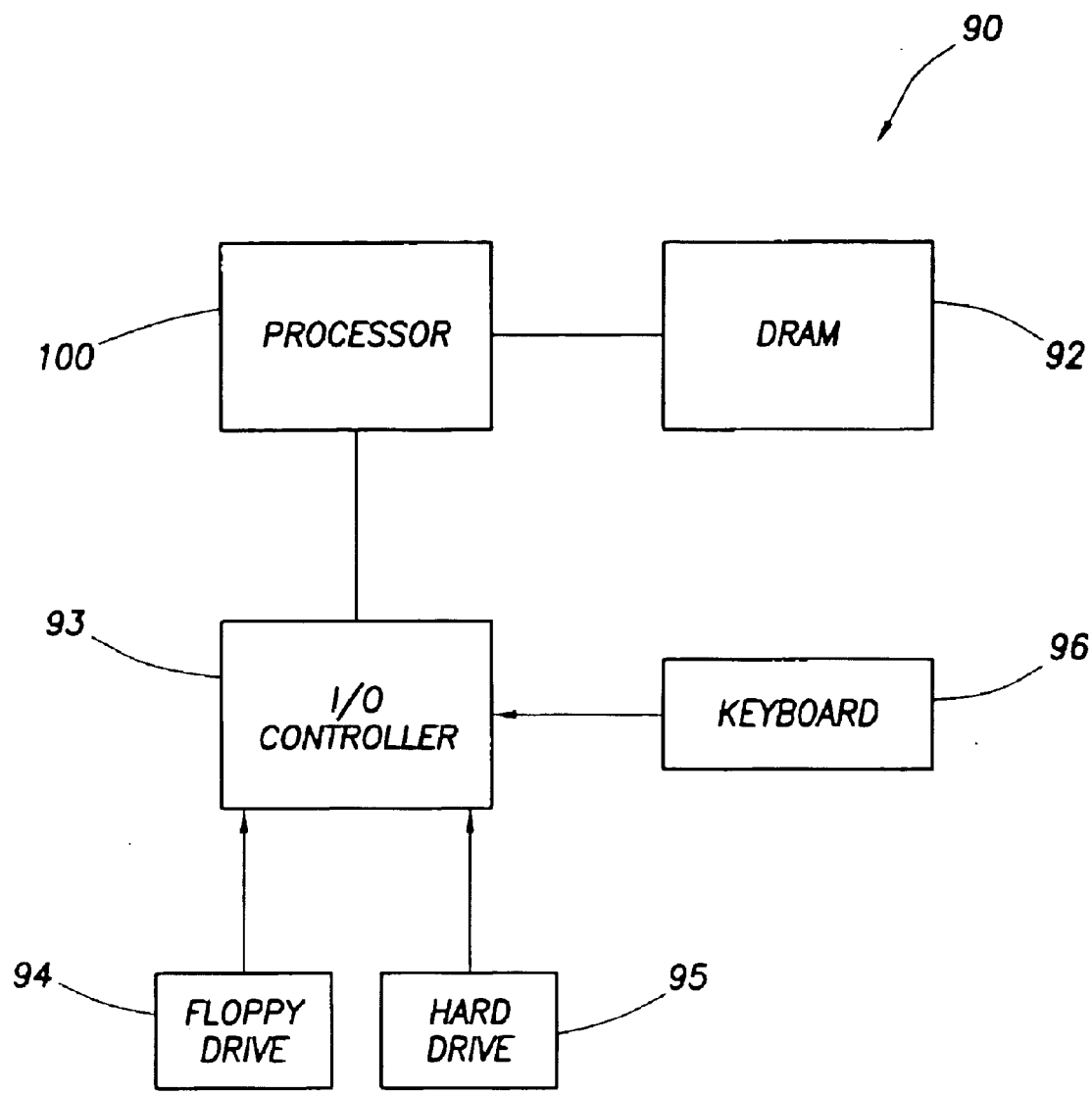
FIG. 1 is a diagram of a computer system constructed in accordance with the preferred embodiment of the invention and including a simultaneous and redundantly threaded processor.

FIG. 1 shows a computer system 90 including a pipelined, simultaneous and redundantly threaded ("SRT") processor 100 constructed in accordance with a preferred embodiment of the invention. Besides processor 100, computer system 90 also preferably includes system main memory in the form of a dynamic random access memory ("DRAM") 92, an input/output ("I/O") controller 93, and various I/O devices which may include a floppy drive 94, a hard drive 95, a keyboard 96, and the like. Each of the various I/O devices may have on-board memory, and the combination of this I/O device memory and the system main memory makes up the overall system memory. The I/O controller 93 provides an interface between processor 100 and the various I/O devices 94–96. The DRAM 92 can be any suitable type of memory devices such as RAMBUS™ memory. In addition, SRT processor 100 may also be coupled to other SRT processors if desired in a commonly known "Manhattan" grid, or other suitable architecture.

Figure 2:
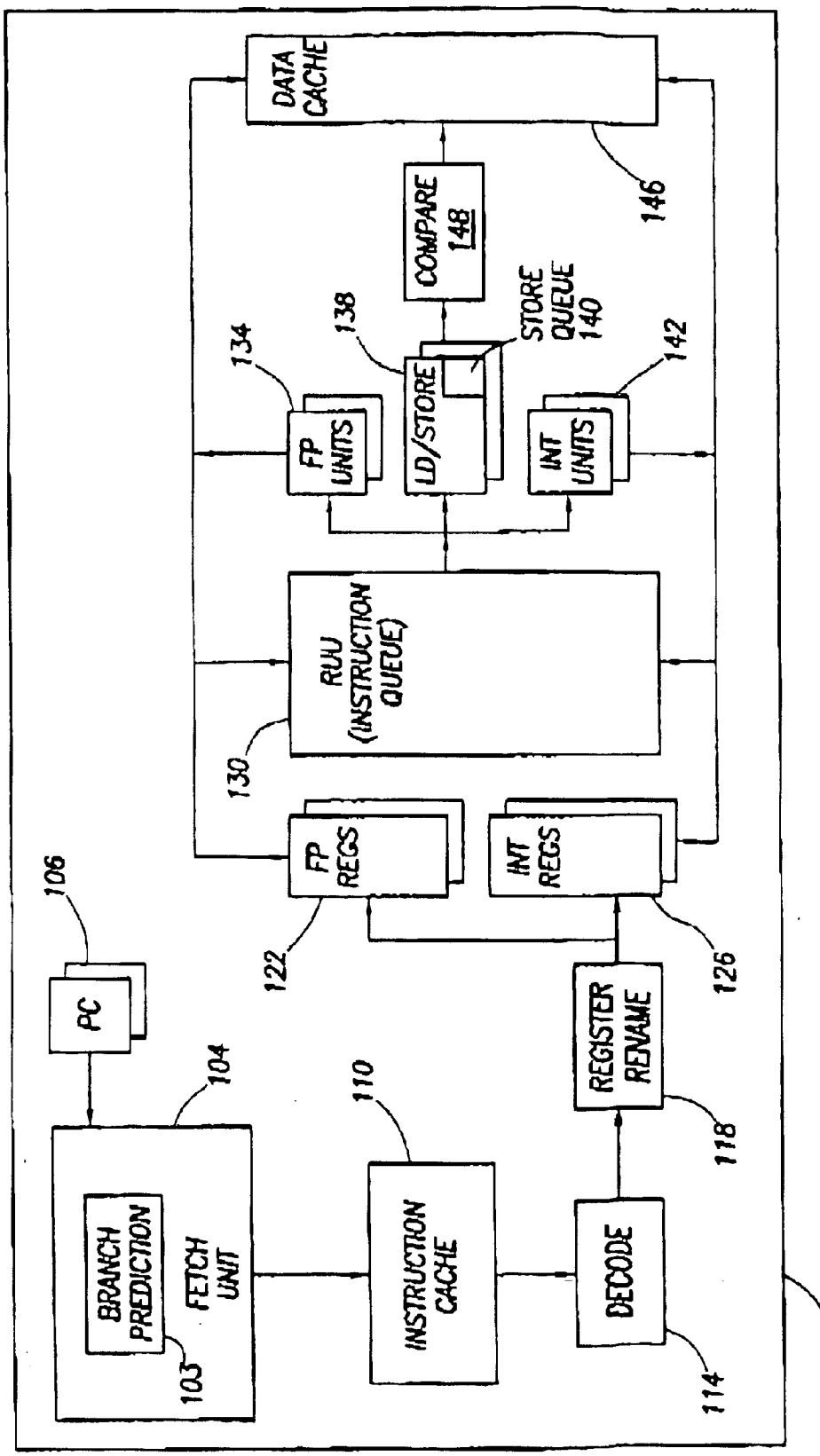
FIG. 2 is a block diagram of the simultaneous and redundantly threaded processor from FIG. 1 in accordance with the preferred embodiment that includes a compare circuit to check for transient faults manifested in differences in committed stores.

FIG. 2 shows the SRT processor 100 of FIG. 1 in greater detail. Referring to FIG. 2, processor 100 preferably comprises a pipelined architecture which includes a series of functional units, arranged so that several units can be simultaneously processing appropriate parts of several instructions. Fetch unit 104 uses a program counter 106 for assistance as to which instruction to fetch. Being a multi-threaded processor, the fetch unit 104 preferably can simultaneously fetch instructions for multiple thread execution. A separate program counter 106 is associated with each thread. Each program counter 106 is a register that contains the address of the next instruction to be fetched from the corresponding thread by the fetch unit 104. FIG. 2 shows two program counters 106 to permit the simultaneous fetching of instructions from two threads. It should be recognized, however, that additional program counters can be provided to fetch instructions from more than two threads simultaneously.

Fetch unit 104 includes branch prediction logic 103 which permits the fetch unit 104 to speculate ahead on branch instructions. In order to keep the pipeline full (which is desirable for efficient operation), the branch predictor logic 103 speculates the outcome of a branch instruction before the branch instruction is actually executed. Branch predictor 103 generally bases its speculation on previous instructions. Any suitable speculation algorithm can be used in branch predictor 103. Also, each thread preferably has its own branch prediction unit 103 (not shown). Referring still to FIG. 2, instruction cache 110 preferably provides a temporary storage buffer for the instructions to be executed. Decode logic 114 preferably retrieves the instructions from instruction cache 110 and determines the type of each instruction (e.g., add, subtract, load, store, etc.). Decoded instructions are then preferably passed to the register rename logic 118, which maps logical registers onto a pool of physical registers.

The register update unit ("RUU") 130 provides an instruction queue for the instructions to be executed. The RUU 130 serves as a combination of global reservation station pool, rename register file, and reorder buffer. The RUU 130 breaks load and store instructions into an address portion and a memory (i.e., register) reference. The address portion is placed in the RUU 130, while the memory reference portion is placed into a load/store queue (not specifically shown in FIG. 2).

The floating point register 122 and integer register 126 are used for the execution of instructions that require the use of such. These registers 122, 126 can be loaded with data from the data cache 146. The registers also provide their contents to the RUU 130, FIG. 2 shows two sets of floating point registers 122 and integer registers 126 for a two-thread processor. However, each thread of the microprocessor preferably has its own set of floating point registers 122 and integer registers 126, thus multiple sets of these registers may be present, depending on the number of threads of the processor.

The execution units 134, 138, and 142 comprise a floating point execution unit 134, a load/store execution unit 138, and an integer execution unit 142. Each execution unit performs the operation specified by the corresponding instruction type. Accordingly, the floating point execution units 134 execute floating instructions such as multiply and divide instruction while the integer execution units 142 execute integer-based instructions. The load/store units 138 perform load operations in which data from memory is loaded into a register 122 or 126. The load/store units 138 also perform store operations in which data from registers 122, 126 is written to data cache 146 and/or DRAM memory 92 (FIG. 1). Operation of the load/store units 138 of the preferred embodiments are discussed more fully below.

Numerous modifications can be made from that shown in FIG. 2. For example, the locations of the RUU 130 and registers 122, 126 can be reversed if desired. For additional information, the following references, all of which are incorporated herein by reference, may be consulted for additional information if needed: U.S. patent application Ser. No. 08/775,553, now U.S. Pat. No. 6,073,169, filed Dec. 31, 1996, and "Exploiting Choice: Instruction Fetch and Issue on an Implementable Simultaneous Multithreaded Processor," by D. Tulisen, S. Eggers, J. Erner, H. Levy, J. Lo and R. Stemm, Proceedings of the $23^{rd}$ Annual International Symposium on Computer Architecture, Philadelphia, Pa. May 1996.

An embodiment provides a performance enhancement to SRT processor. The preferred SRT processor 100 is capable of processing instructions from two different threads simultaneously. Such a processor in fact can be made to execute the same program in the two different threads. More particularly, an SRT processor of an embodiment preferably executes the same program in each thread, however, one thread preferably leads the program execution, the leading thread, and likewise the second thread trails the program execution, the trailing thread. Performance gains may be had over a lockstepped SRT in this manner by having data reads and branch predictions resolved before the second thread reaches the program execution stages where those pieces of information are requested or need to be known. For further information on an embodiment to achieve these performance gains, see co-pending application Ser. No. 09/584,034 titled "Slack Fetch To Improve Performance in Simultaneous and Redundantly Threaded Processor," filed May 30, 2000. Processing the same program through the processor in two different threads permits the processor to detect transient faults caused by cosmic radiation as noted above.

Transient fault detection is preferably accomplished by checking or verifing only memory requests that directly or indirectly affect data values in memory. More particularly, and referring to FIG. 2, an embodiment comprises a store queue 140 and a compare circuit 148. The leading thread of the SRT processor preferably writes its committed stores to the store queue 140. A committed store is a write request generated during execution of a program in the thread. The "committed" portion of the committed store indicates that the store or write request is an affirmative request, as opposed to a write request that may be generated from program steps in a branch of the program that was speculatively executed. A store or write request generated by program steps from the speculative portion of a program may not come to fruition if the branch prediction was incorrect. Thus, a committed store is a write request from a portion of the program that was non-speculatively executed, or from a speculative portion of the program that was indeed the correct branch for execution.

Thus, the leading thread preferably writes this committed store to the store queue 140. However, the committed store does not execute upon its initial insertion in the store queue 140. Rather, the committed store waits in the queue for the trailing thread to reach that point in the program execution. When the trailing thread reaches that point, this second thread then preferably writes its committed store to the store queue 140. In one embodiment, the threads then continue about their execution without regard to the remaining steps required to execute the committed store. In the situation where each of the threads places their committed store into the store queue 140, compare circuit 148 preferably comes into play.

Compare circuit 148 preferably periodically scans the content of the store queue 140. Compare circuit 148 looks for matching store requests. More particularly, the compare circuit 148 preferably compares the address and data from each related committed store request from each thread. The comparison may be a bit for bit comparison of the data, but may also include comparing the sizes of the corresponding stores. If these committed stores from each thread match exactly (their address and write data are exactly the same), then only one of those committed stores or write request is allowed to proceed to update the cache or main memory.

If, however, the compare circuit 148 determines that corresponding committed store or write requests are different in some respect, then a transient fault has occurred. That is, if the address or data of corresponding committed stores are different, then a transient fault has occurred in one of the processor threads. In this situation, the compare circuit 148 preferably initiates a fault recovery scheme or sequence. This fault recovery scheme preferably includes restarting each of the microprocessor threads at a point in the program before the fault occurred.

In a second embodiment of the invention, the trailing thread has sufficient hardware and firmware to perform the verification of the committed store itself. In this second embodiment, the leading thread writes its committed store to the store queue 140. At some time thereafter, the trailing thread commits its corresponding store and, rather than simply placing it in the store queue 140, trailing thread logic scans the store queue 140 for the corresponding write request. If the address and data of the committed store written previously by the leading thread exactly matches the committed store generated by the trailing thread, the leading thread store in the store buffer 140 is validated, for example, by setting a valid bit within the queue, and the load/store unit 138 therefore executes the data write.

Accordingly, the preferred embodiment of the invention provides for transient fault detection of a SRT processor by comparing committed stores prior to their writes to data cache or system main memory. The above discussion is meant to be illustrative of the principles and various embodiments of the present invention. Numerous variations and modifications will become apparent to those skilled in the art once the above disclosure is fully appreciated. For example, although the embodiments discussed above describe a storage queue in which at least one of the committed stores are placed prior to verification, one of ordinary skill in the art could design many ways in which these two committed stores are compared prior to their execution. That is to say, the compare circuit and storage queue are only exemplary of the idea of verifying the committed stores as a transient fault detection mechanism. Importantly, the transient fault detection for an SRT processor described above is equally applicable in processors that are capable of "out-of-order" program execution, and those that are not. The transient fault detection of the preferred embodiments is not constrained by differences in the order of execution or differences in branch speculation. It is intended that the following claims be interpreted to embrace these and other variations and modifications.

What is claimed is:

1. A computer system, comprising:

a pipelined, simultaneous and redundantly threaded ("SRT") processor having a least two threads; and a system memory coupled to said processor;

wherein said SRT processor further comprises a load/store execution unit having a store queue that stores memory requests submitted by the at least two threads, where said memory requests change values in system memory directly or indirectly;

a compare logic coupled to said load/store execution unit;

that scans the contents of said store queue for corresponding memory requests, and said compare logic verifies that each corresponding memory request matches; and wherein said compare logic, based on whether the corresponding memory requests match, performs one of allowing the memory request to execute or initiating fault recovery.

2. The computer system as defined in claim 1 wherein said memory requests that directly or indirectly change data values in system memory further comprise at least committed store requests.

3. The computer system as defined in claim 1 further comprising said SRT processor capable of performing, within each thread independently, program instructions in an order different from the other thread.

4. The computer system as defined in claim 1 wherein each of said threads of said processor performs speculative branch execution independently from the other.

5. A method of checking for transient faults in a simultaneous and redundantly threaded processor having at least two threads, the method comprising verifying, as between the at least two threads, only committed store requests and data load requests from sources that are not cached.

6. The method as defined in claim 5 further comprising:
storing a first committed store from a first of the at least two threads;
storing a second committed store from a second of the at least two threads;
comparing at least an address and data field of the first written committed store to at least an address and data field of the second store; and
allowing at least one of the committed stores to execute if the address and data of each of the first and second stores match.

7. The method as defined in claim 6 further comprising:
disallowing execution of either of the first or second committed stores if their address and data fields do not match; and
initiating a fault recovery sequence.

8. A method of detecting transient faults in a simultaneous and redundantly threaded microprocessor having at least two threads, the method comprising:
executing a program as a first thread;
generating a first committed store request from said first thread;
storing said first committed store request in a storage queue;
executing the program as a second thread;
generating a second committed store request from said second thread;
storing said second committed store in said storage queue;
checking an address and data associated with said first committed store request against an address and data associated with said second committed store request in a compare logic; and
allowing one of said first and second committed store requests to execute if the checking step shows those committed store requests are the same.

9. The method as defined in claim 8 wherein executing the first and second threads further comprises executing the first thread a plurality of program steps ahead of the second thread.

10. The method as defined in claim 9 further comprising:
allowing the first and second threads to make speculative branch execution independent of each other.

11. The method as defined in claim 9 further comprising:
allowing the first thread to execute program steps out of an order of the program;
allowing the second thread to execute program steps out of the order of the program; and
allowing each of the first and second threads to execute the program in a different order from each other.

12. A simultaneous and redundantly threaded microprocessor comprising:
a first pipeline executing a first program thread;
a second pipeline executing a second program thread;
a store queue coupled to each of said first and second pipelines;
a compare circuit coupled to said store queue;
wherein each of said first and second program threads independently generate corresponding committed write requests, and each thread places those committed write requests in the store queue; and
wherein said compare circuit detects transient faults in operation of said first and second pipeline by comparing at least the committed store requests from each thread.

13. A pipelined, simultaneous and redundantly threaded ("SRT") processor, comprising:
a fetch unit that fetches instructions from a plurality of threads of instructions;
an instruction cache coupled to said fetch unit and storing instructions to be decoded and executed; and
decode logic coupled to said instruction cache to decode the type of instructions stored in said instruction cache;
wherein said processers a set of instructions in a leading thread and also in a trailing thread, and wherein the instructions in the trailing thread are substantially identical to the instructions in the leading thread, the instructions in the trailing thread beginning processing through the processor after the corresponding instructions in the leading thread begin processing through the processor;
and wherein said processor detects transient faults by verifying as between the leading and trailing threads only the committed stores and uncached memory read requests.

14. A method of detecting transient faults in a simultaneous and redundantly threaded microprocessor having at least two threads, the method comprising:
executing a program as a first thread;
generating a first committed store request from said first thread;
storing said first committed store request in a storage queue;
executing the program as a second thread;
generating a second committed store request from said second thread;
checking an address and data associated with said first committed store request against an address and data associated with said second committed store request; and
allowing one of said first and second committed store requests to execute if the checking shows those committed store requests are the same.

15. The method as defined in claim 14 wherein executing the first and second threads further comprises executing the first thread a plurality of program steps ahead of the second thread.

16. The method as defined in claim 15 further comprising:
allowing the first and second threads to make speculative branch execution independent of each other.

17. The method as defined in claim 15 further comprising:
allowing the first thread to execute program steps out of an order of the program;
allowing the second thread to execute program steps out of the order of the program; and
allowing each of the first and second threads to execute the program in a different order from each other.

18. A simultaneous and redundantly threaded microprocessor comprising:
a first pipeline executing a first program thread;
a second pipeline executing a second program thread;
a store queue coupled to at least said first pipelines;
wherein each of said first and second program threads independently generate corresponding committed write requests, at least said first thread places the committed write requests in the store queue; and
wherein second thread detects transient faults in operation of said first and second pipeline by comparing at least the committed store requests from each thread.

* * * * *

UNITED STATES PATENT AND TRADEMARK OFFICE
CERTIFICATE OF CORRECTION

PATENT NO. : 6,854,075 B2
APPLICATION NO. : 09/837995
DATED : February 8, 2005
INVENTOR(S) : Shubhendu S. Mukherjee et al.

It is certified that error appears in the above-identified patent and that said Letters Patent is hereby corrected as shown below:

IN THE SPECIFICATION

Column 1, line 31, delete "U.S. Pat. No. 8,598,122" and insert therefor --U.S. Pat. No. 6,598,122--

IN THE CLAIMS

Claim 13, Column 10, line 9, delete "processors" and insert therefor --processor processes--

Claim 18, Column 10, line 63, after "wherein" insert --said--

Signed and Sealed this

Tenth Day of June, 2008

JON W. DUDAS
*Director of the United States Patent and Trademark Office*